United States Patent
Nakano et al.

(10) Patent No.: US 6,535,790 B2
(45) Date of Patent: Mar. 18, 2003

(54) AUTOMATED LIBRARY SYSTEM WITH RETRIEVING AND RESPOSITING ROBOT

(75) Inventors: Yoshiyuki Nakano, Kanazawa (JP); Yusuke Kihara, Tokyo (JP); Katsuki Sakimoto, Yuuki (JP); Yoshiki Hayashi, Gifu-ken (JP)

(73) Assignee: Kanazawa Institute of Technology, Nonoichi-Machi (JP)

( * ) Notice: Subject to any disclaimer, the term of this patent is extended or adjusted under 35 U.S.C. 154(b) by 136 days.

(21) Appl. No.: 09/790,430

(22) Filed: Feb. 21, 2001

(65) Prior Publication Data

US 2001/0020197 A1 Sep. 6, 2001

(30) Foreign Application Priority Data

Feb. 21, 2000 (JP) .......................... 2000-105688

(51) Int. Cl.$^7$ .............................. G06F 7/00; B65B 1/00; B65B 65/00

(52) U.S. Cl. ..................... 700/214; 414/277; 235/385; 700/225; 700/226

(58) Field of Search ................................. 700/214, 215, 700/225, 226; 414/273, 274, 277; 235/383, 385

(56) References Cited

U.S. PATENT DOCUMENTS

| | | | |
|---|---|---|---|
| 5,156,513 A | | 10/1992 | Galan et al. |
| 5,175,690 A | * | 12/1992 | Berthier et al. ............. 700/214 |
| 5,288,980 A | * | 2/1994 | Patel et al. ................. 235/380 |
| 5,740,061 A | * | 4/1998 | Dewey et al. .............. 700/214 |
| 6,195,006 B1 | * | 2/2001 | Bowers et al. ............. 700/225 |
| 6,232,870 B1 | * | 5/2001 | Garber et al. .............. 235/385 |
| 6,335,686 B1 | * | 1/2002 | Goff et al. ................. 340/572.4 |

FOREIGN PATENT DOCUMENTS

| | | |
|---|---|---|
| CA | 463877 | 9/1984 |
| JP | 60-079663 | 4/1985 |
| JP | 60-42005 | 5/1985 |

(List continued on next page.)

*Primary Examiner*—Christopher P. Ellis
*Assistant Examiner*—Gene O. Crawford
(74) *Attorney, Agent, or Firm*—Brinks Hofer Gilson & Lione (57) ABSTRACT

The present invention relates to a robot for individually removing requested books from their prescribed locations in bookracks and returning them, a hand mechanism for the robot, and an automated library book handling system incorporating the robot. The robot comprises a carriage that moves itself around a bookrack in which are formed a plurality of shelf sections having shelf section identification information indicated thereon, in which library books having book identification information indicated thereon are stored upright in shelf sections prescribed therefor; and mounted on the carriage are a hand mechanism; a control unit for controlling three-dimensional motion of the hand mechanism opposite the bookrack; a mobile computer for obtaining, based on instructions from a library book check-out and return counter, the identification information for a requested book along with the requested book's prescribed shelf section storage location, and performing guidance control of the carriage and the three-dimensional motion of the hand mechanism; and a mobile power supply. The hand mechanism of the robot further comprises an identification information recognition unit for detecting shelf section identification information indicated on the bookrack as well as book identification information indicated on the library books, and recognizing a requested book's prescribed shelf section storage location, and a requested book present at that prescribed shelf section storage location; a book pullout mechanism for pulling-out a requested book from a row of books in a shelf section; and a book-holding mechanism for removing the pulled-out book by grasping the book across the thickness direction thereof.

13 Claims, 6 Drawing Sheets

FOREIGN PATENT DOCUMENTS

| | | |
|---|---|---|
| JP | 01-042893 | 2/1989 |
| JP | 55-050398 | 4/1990 |
| JP | 03-312324 | 11/1991 |
| JP | 04-278611 | 10/1992 |
| JP | 05-213927 | 8/1993 |
| JP | 05-229754 | 9/1993 |
| JP | 05-296280 | 11/1993 |
| JP | 06-19401 | 2/1994 |
| JP | 06-81398 | 4/1994 |
| JP | 7-81706 | 3/1995 |
| JP | 52-73565 | 6/1997 |
| JP | 52-73566 | 6/1997 |
| JP | 10-015699 | 1/1998 |
| JP | 10-122261 | 5/1998 |
| JP | 11-32440 | 2/1999 |
| JP | 2000175546 | 6/2000 |

* cited by examiner

AUTOMATED LIBRARY SYSTEM WITH RETRIEVING AND RESPOSITING ROBOT

BACKGROUND OF THE INVENTION

1. Field of the Invention

The present invention relates to a library retrieving and repositing robot that performs, in succession, the tasks of quickly retrieving individual books desired by library patrons from among many books arranged on the bookshelves of the library, and transporting them; and taking books that have been returned by library patrons, and returning them to the bookshelves one at a time, securely placing each book upright in its proper shelf location. It also relates to an automatic library system incorporating such a robot in a configuration that is fully compatible with existing the open-shelf-type book racks most commonly used in libraries today.

2. Description of the Related Art

Recent years have seen an increased awareness of the need for lifelong learning, and major growth in knowledge-based industries. Along with this, the general public has come to make greater use of existing general library facilities, and to expect a higher level of service from them. Consequently, librarians and other skilled library workers are now expected to provide many highly specialized services that require detailed knowledge of publications and library science. In the majority of the libraries in existence today, however, a large part of the normal workday of such skilled library staff members is taken up with handling library books: i.e., finding a book desired by a library patron, taking it off the shelf, and placing it in the hands of the user who requested it; and taking books that have been returned by users, carrying them to the bookracks, and returning them to their proper locations on the shelves. To improve the availability of specialized intellectual services that can only be rendered by skilled library staff demands that mechanization be employed to streamline the task of retrieving and repositing library books requested by library patrons.

Known in the art are book storage management systems that use 'automated stock storage technology' such as disclosed, for example, in Japanese Laid-open patent publication no. H07-81706 [(See also U.S. Pat. No. 5,690,463)] which describes a mechanized system for improving the efficiency of tasks involved in selecting desired books and withdrawing them from a book storage facility designed for extremely low-cost storage of the large book stocks maintained by libraries. Such book storage management systems, however, operate only in conjunction with specially-designed book storage facilities. They will not work with the ordinary libraries in existence today, where members of the general public frequently roam through the bookracks, picking out desired books directly, and taking them off the shelves. These prior book storage management systems are not compatible with the manual selection and removal of a desired book on the spot: Their storage areas serve simply as warehouses in which books are placed for storage.

In these conventional book storage management systems, the many books to be stored are classified in advance, and then divided for placement, by class, in a large number of containers, each of which is analogous to one section of a large book rack. To provide the most economical book storage, these many containers are then stacked one on top of the other in a stack room, to form high, closely-spaced stacks that enable as many books as possible to be stored in the smallest possible space. A large-scale conveyer system links the stack room to book users. When a library patron requests a desired book, a mechanical apparatus finds the container that contains the class of books to which the desired book is assigned. The selected container with its many books is then placed on the conveyer that carries it to a library user area, where the desired book within the class contained in that container can easily be found, and removed by hand.

To implement this large conveyer system in a common library would require costly and inconvenient construction work to remodel the existing facility. This is a major problem. Also, once the system has been installed, the conveyer placement is not something that can easily be changed. This places severe constraints on changes in the layout and configuration of the book stacks. Another problem is that in this system, there is simply no way that general library patrons could be allowed to walk freely among the stacks, removing books from the containers and replacing them by hand. Users who are accustomed to doing this in libraries in which the books are kept in open bookshelves would undoubtedly feel alienated by a book storage management system such as that described above. A library adopting such a system would also necessarily assume a major workload in terms of safety management and system maintenance, and adopting such a system would therefore not provide the needed gains in library staff efficiency through mechanization of the detailed book retrieval and repositing work performed by the staff.

For the foregoing reasons, there is a need for an automated library book retrieving and repositing system that can be implemented in common libraries in existence today without major remodeling of facilities, and that can also be employed in libraries in which bookracks are subject to rearrangement in a variety of configurations.

BRIEF SUMMARY OF THE INVENTION

The present invention was conceived with the above problems and the needs of existing libraries in mind. It is an object of the present invention to provide a library book management system incorporating a robot that can perform, in lieu of library staff, the tasks of locating and removing individual books, and later replacing the books, when users are finished with them, by gently reshelving individual books in their proper locations on the bookshelves. Implementing such an automated robotic library book retrieval and repositing system in conventional libraries will improve efficiency by greatly reducing the book retrieval and repositing workload of library staff, thus enhancing the level of specialized intellectual services that can be provided by those libraries. It is a further object of the present invention to reduce damage to books during robotic book removal and reshelving operations.

To solve the above problems, the present invention provides a book retrieving and repositing robot. The robot has a carriage that moves itself around the periphery of a bookrack in which are formed a plurality of shelf sections. Mounted on the carriage are a hand mechanism; a controller for controlling three-dimensional motion of the hand mechanism; and a computer for determining both the book identification information for a requested book and the requested book's prescribed shelf section storage location information, and controlling the motion of the carriage and the hand mechanism based on that information. The robot's hand mechanism includes an identification information recognition unit for detecting shelf section identification information indicated on the bookrack, as well as book identification information indicated on the library books stored in each section, and recognizing a requested book's prescribed shelf section storage location, and a requested book present at that prescribed shelf section storage location; a book pullout mechanism for pulling-out a requested book from a row of books in a shelf section; and a book-holding mechanism for grasping the pulled-out book and removing it from the bookrack. The invention is constituted such that a desired book can be retrieved from the bookracks without bothering the library staff.

Also provided is a book retrieving and repositing robot having a carriage as described above, on which are mounted a hand mechanism; a controller for controlling the three-dimensional motion of the hand mechanism; and a computer for determining a returned book's prescribed shelf section storage location information and controlling the motion of the carriage and the hand mechanism based on instructions received from a book checkout/return counter. The hand mechanism of the robot includes an identification information recognition unit for detecting shelf section identification information indicated on the bookrack, as well as book identification information indicated on the library books stored in the various sections, and for recognizing a returned book's prescribed shelf section storage location, and the end of a row of books stored in that section; and a book-holding mechanism for grasping the returned book, aligning it with the end of the row of books in the prescribed shelf section storage location, and pushing it in. The invention is constituted such that a returned book can be reshelved in a library's bookracks without bothering the library staff.

In addition, the above problem can be solved through a series of automated book retrieval and repositing systems through which a desired book can be caused to be removed from the bookrack by instructions issued from a checkout/return counter, without bothering the library staff. To achieve this, book retrieving and repositing robots like the one described above are placed in a bookrack area in which the bookracks are arranged such that library staff and patrons may directly access and manually remove books from the racks at will. At a book checkout/return counter, book identification information for a book requested by a library patron is input to a host computer, which then searches for the requested book's prescribed shelf section storage location information, and outputs, along with the requested book identification information, the requested book's prescribed shelf section storage location information. A mobile computer mounted on the book retrieving and repositing robot then controls the motion of the carriage and the hand mechanism of a book retrieving and repositing robot, based on the requested book identification information and the requested book's prescribed shelf section storage location information output from the host computer, to retrieve the desired book from the bookrack.

Also, a series of automated book retrieval and repositing systems can be realized for repositing a book returned to the library in its proper location in the bookrack by issuing instructions from a checkout/return counter, without bothering the library staff. To accomplish this, a book retrieving and repositing robot as described above is placed in a bookrack area such as that described above. At a book checkout/return counter, book identification information for a book returned by a library patron is input to a host computer. That computer is then caused to search for the returned book's prescribed shelf section storage location information, and to output the returned book's prescribed shelf section storage location information. A mobile computer mounted on the book retrieving and repositing robot controls the motion of the carriage and hand mechanism of the book retrieving and repositing robot, based on the returned book's prescribed shelf section storage location information output from the host computer, to return the desired book to its proper location in the bookrack.

The present invention is also configured so as to prevent damage to books during their removal from, and reshelving in a bookrack. For book removal, a hand mechanism of the book retrieving and repositing robot of the present invention has a finger lever, on the forward end of which is provided a book retracting finger for making frictional contact with, and/or hooking, the upper edge of a book, for pressing the book downward and pulling it out in order to remove it from a bookshelf. To avoid damaging the book during this process, the force applied to the finger lever to press the upper edge of the book downward is a resilient force. To avoid damaging returned books when they are being reposited in a row of books in a bookrack by a book retrieving and repositing robot, a special bookend is placed in each shelf section of the bookrack for facilitating the gentle reshelving of books. To accomplish this, the bookend is configured such that, inside of a substantially wedge-shaped housing having trapezoid-shaped top and bottom surfaces and an inclined side surface, positioned at the wide end of the wedge-shaped housing, is a fixed guide roller, axially supported by a vertical shaft such that a portion of the outer circumference of the fixed guide roller partially protrudes outward of the housing through a window formed in the inclined side surface thereof Positioned at the narrow end of the wedge-shaped housing is a rocker arm having at a free end thereof a rocking guide roller axially supported by a vertical shaft, the other end of the rocker arm being axially supported by a vertical shaft such as to be rotatable thereabout in a manner such as to allow the rocking guide roller to float outward of a window formed in the inclined side of the housing. The bookends are provided on the bookshelf sections such as to be urged in the direction in which the rocking guide roller emerges from the window, with the wide end of the bookend facing the back of the bookshelf section and the inclined side of the bookend facing the end of a row of books on the bookshelf section, such that the wedge-shaped slot thus formed between the inclined side surface of the bookend and the end of the row of books can function as a guide slot for the reshelving of returned books.

BRIEF DESCRIPTION OF SEVERAL VIEWS OF THE DRAWINGS

These and other features, aspects, and advantages of the present invention will become apparent with reference to the following description, claims, and accompanying drawing, where:

DETAILED DESCRIPTION OF THE INVENTION

According to one aspect of the library book retrieving and repositing robot of the present invention, the robot comprises a carriage that moves itself around a bookrack in which are formed a plurality of shelf sections having shelf section identification information indicated thereon, in which library books having book identification information indicated thereon are stored upright in shelf sections prescribed therefor; and mounted on the carriage are a hand mechanism; a control unit for controlling three-dimensional motion of the hand mechanism opposite the bookrack; a mobile computer for obtaining, based on instructions from a library book checkout and return counter, the identification information for a requested book along with the requested book's prescribed shelf section storage location, and performing guidance control of the carriage and the three-dimensional motion of the hand mechanism; and a mobile power supply. The hand mechanism of the robot further comprises an identification information recognition unit for detecting shelf section identification information indicated on the bookrack as well as book identification information indicated on the library books, and recognizing a requested book's prescribed shelf section storage location, and a requested book present at that prescribed shelf section storage location; a book pullout mechanism for pulling-out a requested book from a row of books in a shelf section; and a book-holding mechanism for removing the pulled-out book by grasping the book across the thickness direction thereof.

According to another aspect of the library book retrieving and repositing robot of the present invention, the robot comprises a carriage that moves itself around a bookrack in which are formed a plurality of shelf sections having shelf section identification information indicated thereon, in which library books having book identification information indicated thereon are stored upright in shelf sections prescribed therefor; and mounted on the carriage are a hand mechanism; a control unit for controlling three-dimensional motion of the hand mechanism opposite the bookrack; a mobile computer for obtaining, based on instructions from a library book checkout and return counter, the identification information for a returned book along with the returned book's prescribed shelf section storage location, and performing guidance control of the carriage and the three-dimensional motion of the hand mechanism; and a mobile power supply. In this mode, the hand mechanism further comprises an identification information recognition unit for detecting shelf section identification information indicated on the bookrack as well as book identification information indicated on the library books, and recognizing a returned book's prescribed shelf section storage location, and the end of the row of books in the prescribed shelf section storage location; and a book-holding mechanism for holding the returned book by grasping the book across the thickness direction thereof, aligning it with the end of the row of books in the prescribed shelf section storage location, and pushing it in.

According to one aspect of the automated library system of the present invention, the system comprises a bookrack in which are formed a plurality of shelf sections having shelf section identification information indicated thereon, in which library books having book identification information indicated thereon are stored upright in shelf sections prescribed therefor, the bookrack being provided such that library staff and/or library patrons may directly access and manually remove the library books at will; a host computer, further comprising an input unit for inputting, from a book checkout counter, requested book identification information for books requested by library patrons for reading or borrowing, and a memory unit for storing book-to-shelf-section identification information cross-reference data; a computation unit for searching for the requested book's prescribed shelf section storage location information by comparing the requested book identification information inputted by the input unit with the book-to-shelf-section cross-reference data; and an output unit for outputting, along with the requested book identification information, the requested book's prescribed shelf section storage location information obtained as a result of the search; and a retrieving and repositing robot that moves itself around the periphery of the bookrack, further comprising a carriage that moves itself around the periphery of the bookrack; a hand mechanism; a control unit for controlling three-dimensional motion of the hand mechanism opposite the bookrack; and a mobile computer for performing guidance control of the carriage and the three-dimensional motion of the hand mechanism, based on requested book identification information and requested book prescribed shelf section storage location information output from the host computer; the hand mechanism further comprising an identification information recognition unit for detecting shelf section identification information indicated on the bookrack as well as book identification information indicated on the library books, and recognizing a requested book's prescribed shelf section storage location, and a requested book present at that prescribed shelf section storage location; a book pullout mechanism for pulling-out a requested book from a row of books in a shelf section; and a book-holding mechanism for removing the pulled-out book by grasping the book across the thickness direction thereof; wherein the hand mechanism, control unit, and mobile computer are mounted, along with a mobile electrical power supply, on the carriage.

According to another aspect of the automated library system of the present invention, the system comprises a bookrack in which are formed a plurality of shelf sections having shelf section identification information indicated thereon, in which library books having book identification information indicated thereon are stored upright in shelf sections prescribed therefor, the bookrack being provided such that library staff and/or library patrons may directly access and manually remove the library books at will; a host computer, further comprising an input unit for inputting, from a book checkout counter, returned book identification information for books returned by library patrons, a memory unit for storing book-to-shelf-section identification information cross-reference data, and accessing book identification information and corresponding prescribed shelf sections, a computation unit for searching for the returned book's prescribed shelf section storage location information by comparing the returned book identification information inputted by the input unit with the book-to-shelf-section cross-reference data, and an output unit for outputting, along with the returned book identification information, the returned book's prescribed shelf section storage location information obtained as a result of the search; and a retrieving and repositing robot that moves itself around the periphery of the bookrack, further comprising a carriage that moves itself around the periphery of the bookrack, a hand mechanism, a control unit for controlling three-dimensional motion of the hand mechanism opposite the bookrack, and a mobile computer for performing guidance control of the carriage and the three-dimensional motion of the hand mechanism, based on the returned book's prescribed shelf section storage location information output from the host computer; the hand mechanism further comprising an identification information recognition unit for detecting shelf section identification information indicated on the bookrack as well as book identification information indicated on the library books, and recognizing a returned book's prescribed shelf section storage location, and the end of the row of books in the prescribed shelf section storage location; and a book-holding mechanism for holding the returned book by grasping the book across the thickness direction thereof, aligning it with the end of the row of books in the prescribed shelf section storage location, and pushing it in, wherein the hand mechanism, control unit, and mobile computer are mounted, along with a mobile electrical power supply, on the carriage.

According to one aspect of the present invention, a hand mechanism for a book retrieving and repositing robot for a library is placed opposite, and has its motion controlled in three dimensions with respect to, a bookrack in which are formed a plurality of shelf sections having shelf section identification information indicated thereon, in which library books having book identification information indicated thereon are stored upright in shelf sections prescribed therefor. The hand mechanism comprises an identification information recognition unit for detecting shelf section identification information indicated on the bookrack as well as book identification information indicated on the library books, and recognizing a requested book's prescribed shelf section storage location, and a requested book present at that prescribed shelf section storage location; a book pullout mechanism for pulling-out a requested book from a row of books in a shelf section; and a book-holding mechanism for removing the pulled-out book by grasping the book across the thickness direction thereof.

According to another aspect of the present invention, a hand mechanism for a book retrieving and repositing robot for a library is placed opposite, and has its motion controlled in three dimensions with respect to, a bookrack in which are formed a plurality of shelf sections having shelf section identification information indicated thereon. The hand mechanism comprises an identification information recognition unit for obtaining the prescribed shelf section storage location information for a returned book based on instructions from a library book checkout and return counter, detecting shelf section identification information indicated on the bookrack as well as book identification information indicated on the library books, and recognizing a returned book's prescribed shelf section storage location, and the end of the row of books in the prescribed shelf section storage location; and a book-holding mechanism for holding the returned book by grasping the book across the thickness direction thereof, aligning it with the end of the row of books in the prescribed shelf section storage location, and pushing it in.

Figure 1:
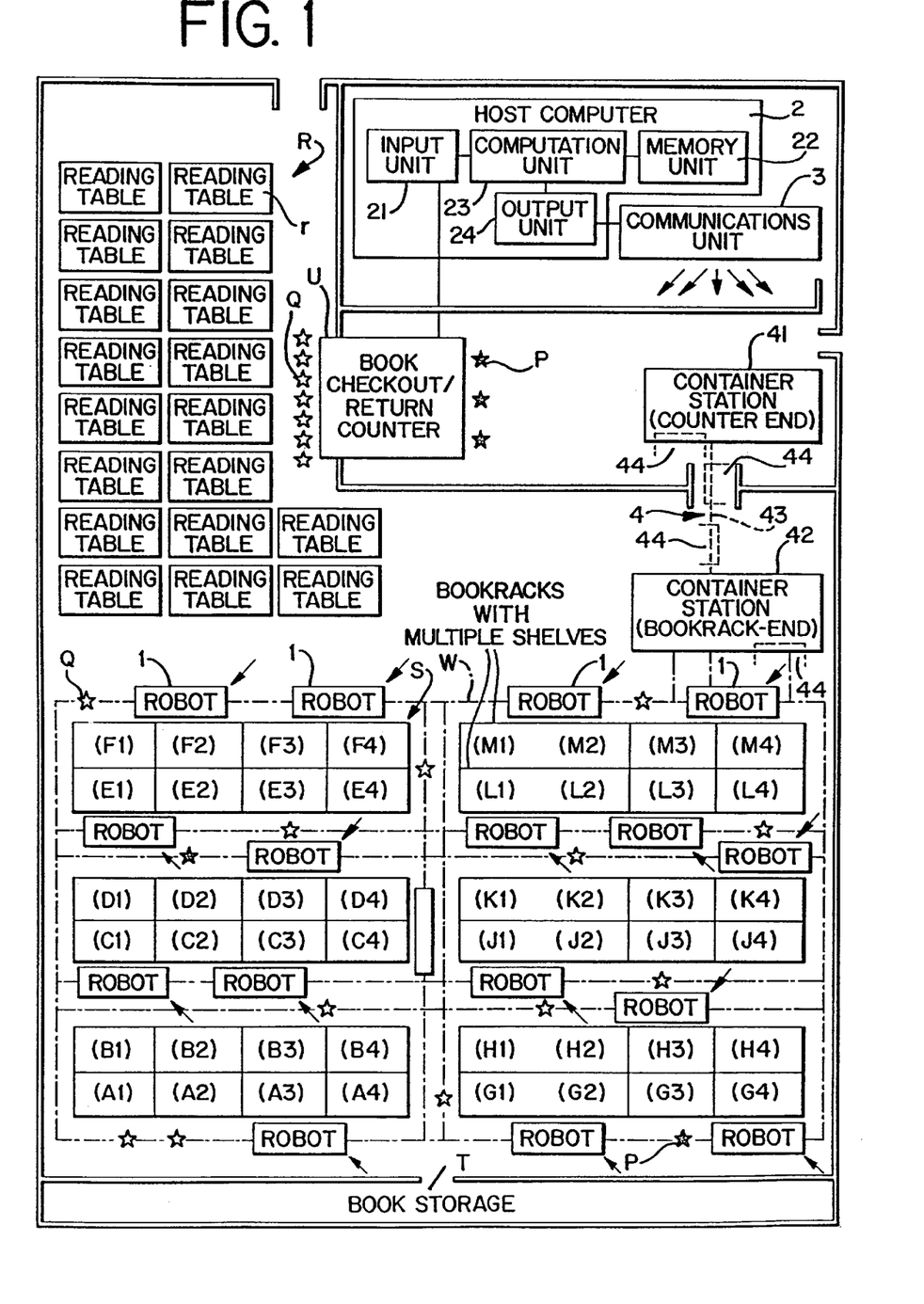
FIG. 1 is a simplified diagram of an embodiment of an automated library system according to the present invention.

The best mode for carrying out the present invention will now be described with reference to the drawing. FIG. 1 is a simplified block diagram of an automated library system with retrieving and repositing robot according to the present invention, including a floor plan for a library facility equipped with such a system. As shown in FIG. 1, the library has a reading area R in which are provided a number of reading tables r, a bookrack area S, a book storeroom T, and a book checkout/return counter U, all of which are the same as those in conventional libraries. At the library counter U, library staff members P (librarians and other workers) interact with library patrons Q to conduct library transactions such as returning or checking out books on loan (or obtaining books to be read on site).

Positioned in the bookrack area S are a number of multi-level bookracks (A1–A4, B1–B4, C1–C4, D1–D4, E1–E4, F1–F4, G1–G4, H1–H 4, J1–J4, K1–K4, L1–L4, and M1–M4) having shelves from top to bottom on which books are placed upright in rows. The bookracks are organized in blocks (six blocks in this example). In this specification, the shelves of these multi-level bookracks will generally be referred to as 'shelf sections.' The bookrack area S uses open-shelf-type bookracks configured so that library patrons Q can roam among the bookracks, directly removing desired books from the bookracks A1–M4 at will. Library staff members P may also enter the bookrack area S at any time to assist library patrons Q with books. The book storeroom T, which is used to store books that are not often requested, is off limits to general library patrons Q, and is entered only when necessary, by library staff members P.

Figure 2:
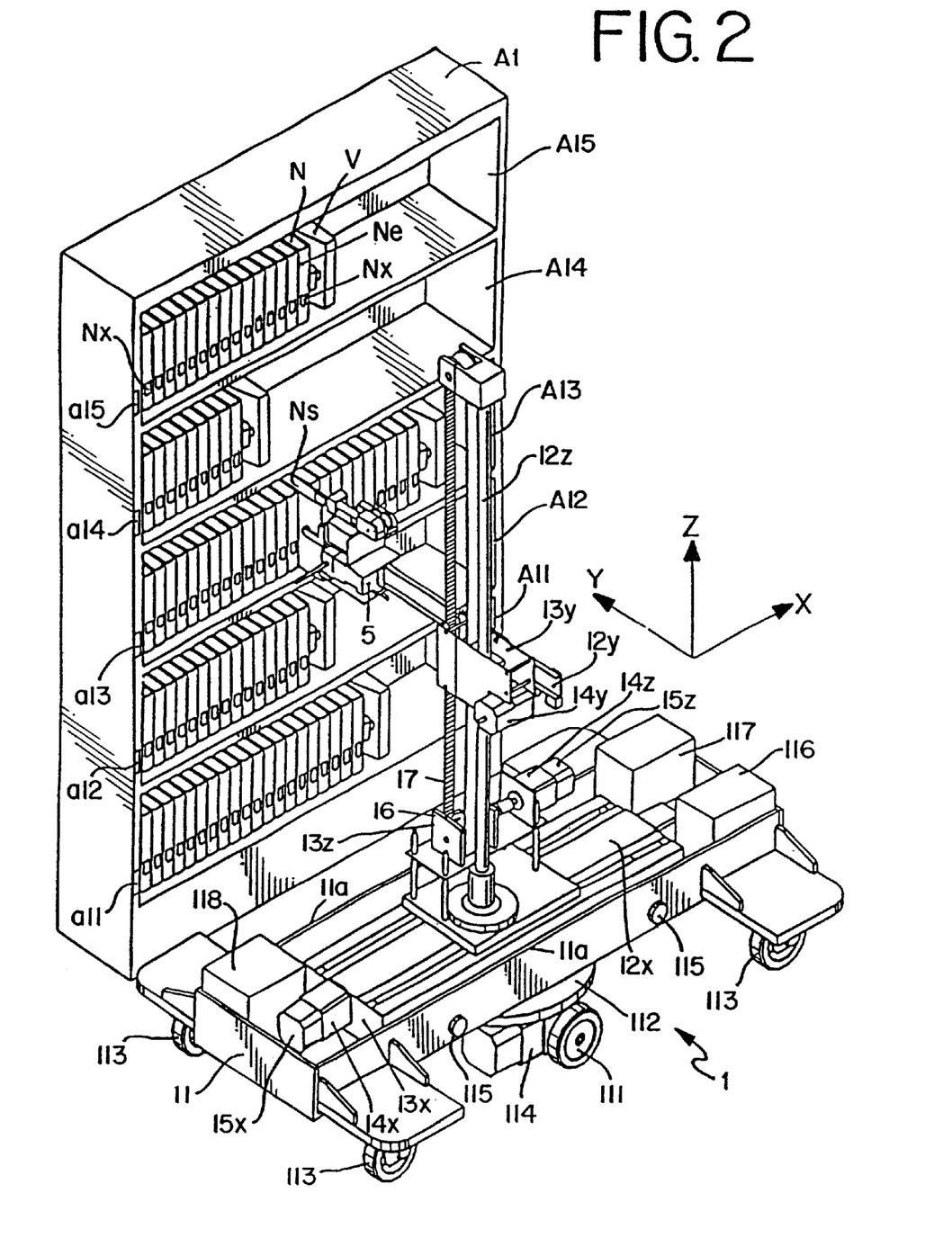
FIG. 2 shows an isometric view of a book retrieving and repositing robot for a library in an embodiment of the present invention, and a bookrack associated therewith.

Individual bookracks (A1–A4, B1–B4, C1–C4, D1–D4, E1–E4, F1–F4, G1–G4, H1–H 4, J1–J4, K1–K4, L1–L4, and M1–M4) are assigned 'rack ID codes' (bookrack identification information), the shelf sections within the bookracks are assigned 'section ID codes' (shelf section identification information), and the applicable rack and section ID code is applied to each rack and shelf section. The rack and section ID codes are grouped into ID code series, such that each specific bookrack and shelf section can be recognized from its ID code series. As shown in FIG. 2, for example, attached to the frame at the left side of the book rack A1 (as viewed from the front) are the rack/section identifiers a11, a12, a13, a14, and a15, uniquely identifying both the rack and section (i.e., they provide, in effect, the same information as the 'shelf section identification information,' which may be referred to hereinafter as 'shelf section ID data'). The rack and section ID codes are also indicated by standard bar codes. Stored upright in horizontal rows in each of the shelf sections (e.g., shelf sections A11 through A15 of bookrack A1) are a number of books N. Placed at the end of each row of books N is a bookend V of sufficient weight to prevent the books from tipping over. Affixed to the surface of the back portion of the book cover Ne of each book N is book identification information Nx (hereinafter, 'book ID data:' a bar code, IC card, etc. containing the book ID code).

In the present invention, the tasks of removing books from and returning them to the bookracks are performed by book retrieving and repositing robots (hereinafter, 'robots'). A staff member P at the book checkout/return counter U issues an instruction to retrieve a book desired by a library patron. Based on this instruction, a robot 1 moves along a guide path W embedded in the floor of the bookrack area S. The robot 1 moves back and forth between bookrack blocks as required to locate the requested book from among the many books N contained in the bookracks A1–M4. Books returned to the library by users Q are reposited (returned to their prescribed shelf section locations in the bookracks) by a similar process. There are a variety of means by which a robot 1 may be guided along the guide path W: Basically, the robot 1 moves over a guide path W as it detects (by electromagnetic or optical means) the presence of surface markers such as reflective tape, or markers embedded in the floor, such as IC tags, metal fragments, magnetic material fragments, or cable.

As shown in FIG. 1, the system of the present invention includes a host computer 2, an input unit 21, a memory unit 22, a computation unit 23, and an output unit 24. From the book checkout/return counter U, the input unit 21 receives inputs related to requested books Ns (books desired by library patrons Q for reading or borrowing) and returned books Np (books returned to the library by library patrons Q); that is, it receives requested/returned book ID data Nxs/Nxp (not shown in the drawing). The memory unit 22 stores book-to-shelf-section identification information cross-reference data (the book ID data Nx for each book in the library, along with the shelf section ID data for the shelf section in which that book is to be stored.) The computation unit 23 performs computer searches for the shelf section storage location in which a requested book Ns is stored by comparing the requested book ID data it receives through the input unit 21 with book-to-shelf-section cross-reference data it obtains from the memory unit 22, and sends its search results (the book ID data for the requested book, along with that book's prescribed shelf section storage location) to the output unit 24. A communications unit 3 receives the data output by the output unit 24 of the host computer 2 (book ID and corresponding storage location ID), and transmits it to one of the robots 1. From the data received from the communications unit 3, the robot 1 extracts book ID data for a book requested or returned by a library patron Q, along with the prescribed shelf location information for that book. The robot 1 finds the book and removes it from the bookshelf (if it is a requested book), or reshelves the book by returning it to its prescribed bookshelf section (if it is a returned book).

A book transport system 4 is installed between the book checkout/return counter U and the bookrack area S. This book transport system 4 is made up of a counter-end container station 41, a bookrack-end container station 42, a connecting conveyer 43 therebetween, and a container 44. In response to instructions from the book checkout/return counter U, a robot 1 removes a book from a shelf section of the bookracks, carries the book to the bookrack-end container station 42, and places it in the container 44. The container 44 with the book contained therein is transported to the counter-end container station 41 by the conveyer 43. At the counter-end container station 41, the book contained in the container 44 is removed by a staff member P and handed to a library patron Q. Conversely, a book returned to the book checkout/return counter by a library patron Q is placed in the container 44 at the counter-end container station 41 by a library staff member P to be transported to the bookrack-end container station 42. At the bookrack-end container station 42, a robot 1 removes the book from the container 44 and places it in the prescribed section of the bookrack. It should be noted that in the automated library system of the present invention, a book transport system of this type is not always required. It is an option that may or may not be adopted, based on factors such as the location of the book checkout/return counter U with respect to the bookrack area S.

Figure 3:
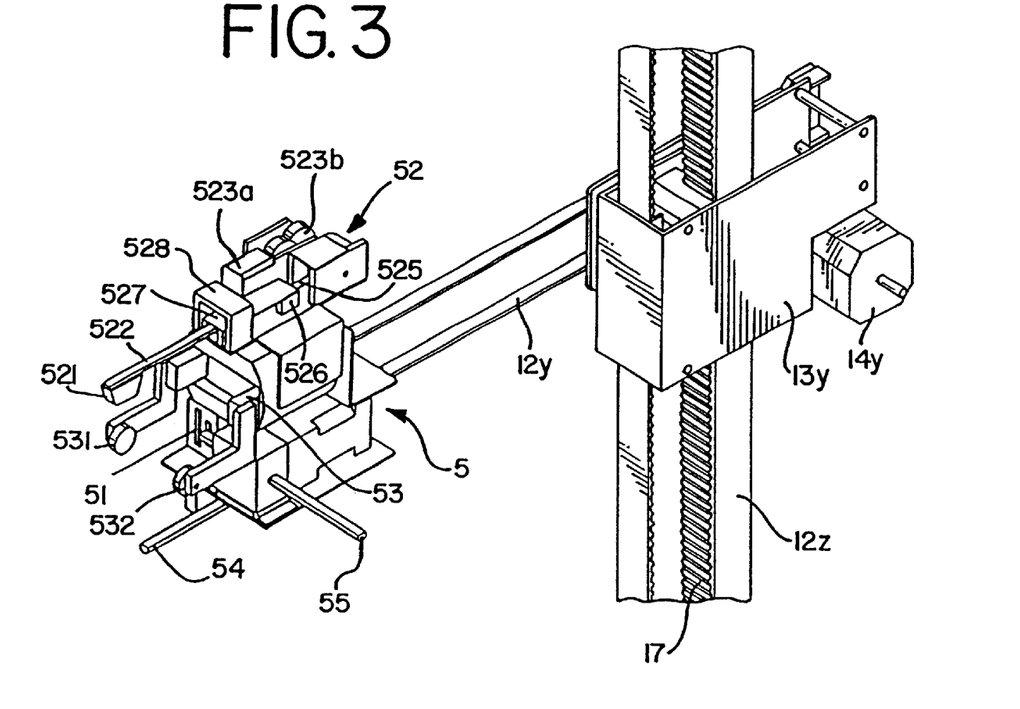
FIG. 3 shows an isometric view of the hand mechanism of the book retrieving and repositing robot of FIG. 1.
Figure 4:
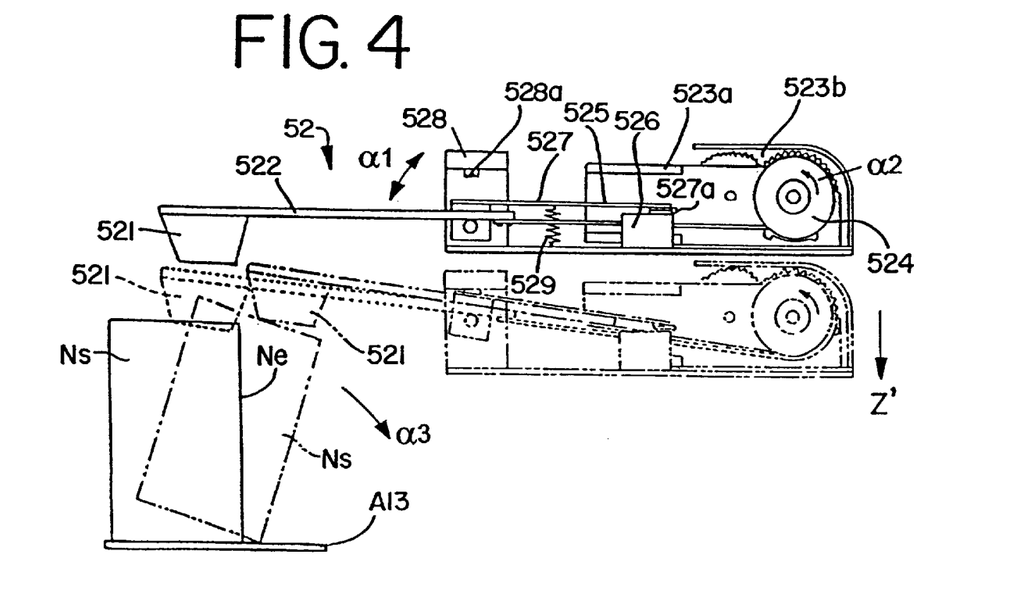
FIG. 4 shows an internal side view of the book pullout mechanism of the hand mechanism of FIG. 3.

FIG. 2 shows the relationship between the robots and bookracks. FIG. 3 shows a hand mechanism (a key component of the robot). FIG. 4 shows the internal construction and operation of a book pullout mechanism (a key component of the hand mechanism). The robot 1 shown in FIG. 2 is a three-dimensional orthogonal axis-type self-propelled, self-guided robot. It has a carriage 11 that is controlled to travel along the guide path W mentioned above. Provided on the carriage 11 are a lateral guide rail (X-axis guide rail) 12x, an in-out guide rail (Y-axis guide rail) 12y, and a vertical guide rail (Z-axis guide rail) 12z, oriented along mutually orthogonal X, Y, and Z axes (three-dimensional orthogonal axes), respectively. The X-axis (lateral) guide rail 12x is installed on the carriage 11. The vertical (Z-axis) guide rail 12z is supported vertically on the on the lateral guide rail 12x such as to be movable from side to side along the X axis. The in-out (Y-axis) guide rail 12y is supported horizontally on the vertical (Z-axis) guide rail 12z such as to be movable up and down along the vertical guide rail 12z, and also to be movable in and out along the Y axis. A lateral motion control unit 13x has an X-axis servo motor 14x and an X-axis encoder 15x for controlling the side-to-side motion of the vertical (Z-axis) guide rail 12z. An in-out motion control unit 13y controls the in-out (extension/retraction) motion of the in-out (Y-axis) guide rail 12y, through a Y-axis servo motor 14y. A vertical motion control unit 13z has a Z-axis servo motor 14z, a Z-axis encoder 15z, a transmission pulley 16, and a transmission belt 17 for controlling the vertical motion of the in-out (Y-axis) guide rail 12y. Attached to the forward end of the in-out (Y-axis) guide rail 12y is the hand mechanism 5 that is a key component of the robot 1.

In the present example, the 'in,' 'out,' 'left,' and 'right' directions are defined as follows: For a robot 1 positioned opposite a bookrack (e.g. bookrack A1) and situated parallel to the front of the bookrack, as shown in FIG. 2, the 'in' direction is the direction going toward the bookrack A1, and the 'out' direction is the direction going away from the bookrack A1. The 'left' and 'right' directions are to the left and right, respectively, when facing the bookrack A1.

Drive wheels 111, attached to the center of the bottom of the carriage 11 through a steering table 112, are driven by a propulsion motor 114. Subordinate wheels 113 are provided at the front and rear of the carriage 11. Ultrasonic wave-type distance sensors 115 are attached to side panels 11a of the carriage 11. Also mounted on the carriage 11 are a mobile communications unit 116, a mobile computer 117, and a mobile electrical power supply 118. The mobile communications unit 116 receives data transmitted from the communications unit 3 located at the checkout/return counter U (discussed above), and inputs this data to the mobile computer 17 [for controlling the movements of the robot 1]. The mobile communications unit 116 receives, for example, book ID data, and shelf section ID data (prescribed storage location) for books requested by library patrons Q, and inputs that information to the mobile computer 117, which uses it to control the motion of the carriage 11 and the operation of the hand mechanism 5. The mobile electrical power supply 118 supplies power to the mobile communications unit 116, the mobile computer 117, and the motors mounted on the carriage 11.

The hand mechanism 5, a key component of the robot 1, is installed on the forward end of the in-out (Y-axis) guide rail 12y. As shown in FIG. 3, the hand mechanism 5 comprises an identification information recognition unit (e.g., a bar code reader) 51 for reading bookrack/shelf section identifiers affixed to the bookracks, and book identifiers affixed to the books; a book pullout mechanism 52; a book-holding mechanism 53, provided with two arms (531 and 532) for grasping a book therebetween by pressing inward on the front and back covers thereof; a touch finger 54 protruding outward of its forward end; and a pusher 55 extending outward to its left.

As shown in FIG. 4, the book pullout mechanism 52 comprises a finger lever 522 with a book pullout finger 521 provided at its forward end; a take-up pulley 524 that is driven in rotation, through a speed reduction gear 523b, by a finger motor 523a; a belt 525 strung between the rear end of the finger lever 522 and the take-up surface around the circumference of the take-up pulley 524; a belt guide {526}; a movable guide 527; and a stopper 528. To remove a requested book from a sectioned shelf of a bookrack, the book pullout finger 521 at the forward end of the finger lever 522 makes pressure contact with the upper edge of a requested book Ns, and/or engages (hooks) the spine portion Ne of the book cover and pulls the top of the requested book Ns outward from the row of books.

The rear end of the movable guide 527 is supported by the belt guide 526 such that it is free to rotate about the axis of its support shaft 527a in the direction of the arrow α1. Provided on the stopper 528 is a limit switch 528a. The limit switch 528a is operated by motion of the movable guide 527 in the direction of the arrow α1. The rear of the finger lever 522 engages the movable guide 527. The belt 525, which passes through the belt guide 526, has one of its ends connected to the finger bar 522, and other end connected to the take-up surface around the circumference of the take-up pulley 524. When the take-up pulley 524 rotates in the direction of the arrow α2, it takes up the belt 525, pulling the finger lever 522 (and book pullout finger 521) rearward. The movable guide 527 is spring-loaded downward by a spring 529. Thus through the movable guide 527, the finger lever 522 and book pullout finger 521 are also spring-loaded in the downward direction by the spring 529. Thus because of the resilience of the spring 529, when the book pullout finger 521 makes pressure contact with and/or hooks the upper edge of a requested book Ns, it does so gently, without imparting shock to the upper edge of the book. As an alternative, the finger lever 522 itself can be made resilient by forming it from spring material, to thus achieve the same effect as that obtained by the downward spring-loading of the spring 529. This method will also enable the book pullout finger 521 to make contact without applying shock to the upper edge of a requested book Ns.

The bookends V are provided to aid the reshelving process such that when a book returned by a library patron Q is grasped by the book holding mechanism 53 of the hand mechanism 5 of the robot 1 to replace it in its prescribed shelf section, that book can be placed upright on the bookrack shelf in a smooth action, without damaging the book.

Figure 5:
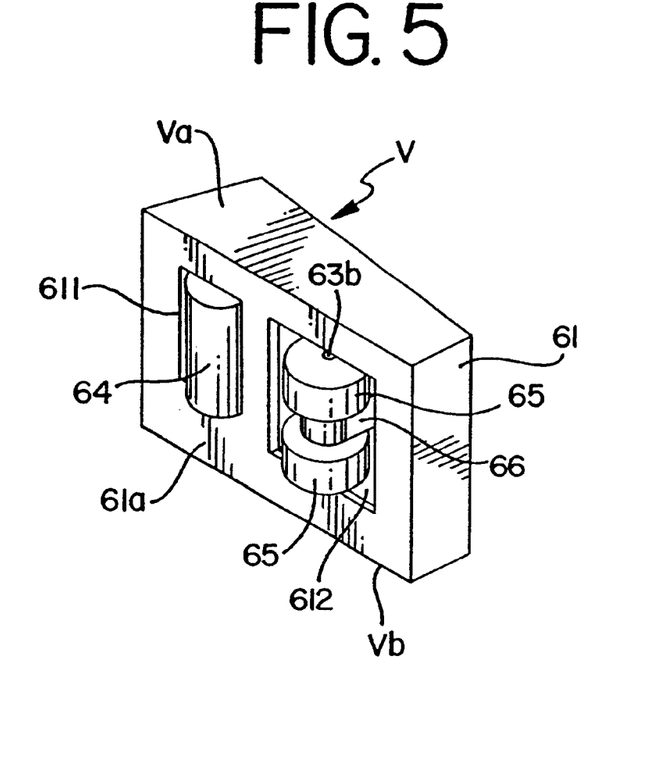
FIG. 5 shows an isometric view of a bookend for use in a library bookrack.
Figure 6:
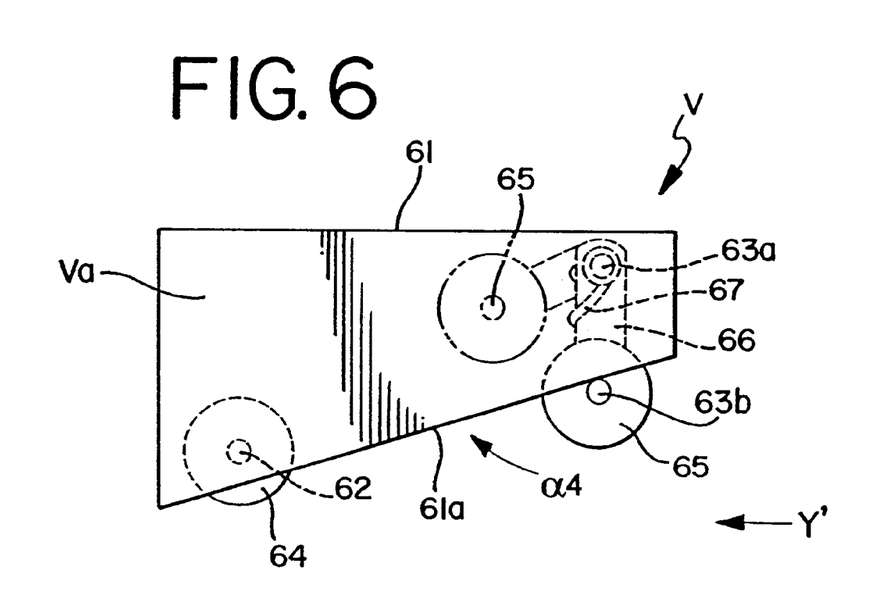
FIG. 6 shows a plan view of the bookend of FIG. 5.

The construction of a bookend V is shown in FIGS. 5 and 6. Inside of a substantially wedge-shaped housing 61 having trapezoid-shaped top and bottom surfaces (Va and Vb, respectively), and an inclined side surface 61a, positioned at the wide end of the wedge-shaped housing 61 is a fixed guide roller 64 that is axially supported by a vertical shaft 64 such that a portion of the outer circumference of the fixed guide roller 62 partially protrudes outward of the housing 61 through a window 611 formed in the inclined side surface 61a thereof Also, positioned at the narrow end of the wedge-shaped housing 61 is a rocker arm 66 having, at a forward end thereof, a rocking guide roller 65 that is axially supported by a vertical shaft 63b, the other end of the rocker arm 66 being axially supported by a vertical shaft 63a such as to be rotatable thereabout in a manner that will allow the rocking guide roller 65 to float outward of a window 612 formed in the inclined side 61a of the housing 61. The rocker arm 66 is constantly urged, by a spring 67, in the direction opposite that of the arrow α4. Therefore, if an external force in the direction of the arrow Y' is applied to the rocking guide roller 65, the rocking guide roller 65 swings in the direction of the arrow α4, retreating into the wedge-shaped housing 61, and if the external force is removed, the rocking guide roller 65 will emerge from the window 612.

As shown in FIG. 7, a bookend V is placed in each bookshelf section (e.g. shelf section A13), with the wide end of the bookend V toward the inside of the shelf, and the inclined side surface 61a placed facing the end surface of a row of upright books on the shelf of the bookshelf section A13, with the fixed guide roller 64 and rocking guide roller 65 pressed against the end of the row of books, to prevent the books from tipping over. In this state, a wedge-shaped slot formed between the inclined side surface 61a of the bookend V and the end surface of the row of books on the shelf becomes a reshelving guide slot 61b for a returned book Np.

The operation of the above library book retrieving and repositing robot 1 will now be described, along with the functions of an automated library book management system in a library incorporating such robots. First we will consider how a requested library book is provided in response to a request from a library patron Q. In this system, as discussed above, a host computer 2 is used to control the issue and return of books. To obtain a book, a library patron Q or a library staff member P inputs, to the host computer 2, the 'requested book ID data' Nxs (not shown in the drawing) for the specific requested book Ns. The host computer 2 responds by searching for the bookrack and shelf to which that book is assigned (its 'prescribed shelf section storage location,' e.g., shelf section A13 in multi-level bookrack A1) and the corresponding 'shelf section ID data' (e.g., 'a13'). The host computer 2 outputs the book ID data (Nxs), along with the shelf section ID data for that book (a13) to the communications unit 3. The communications unit 3 transmits the data to a mobile communications unit 116, which outputs it to the mobile computer 117 mounted on the carriage 11 of a robot 1.

Based on this shelf location ID code (a13) and book ID data (Nxs), the mobile computer 117 proceeds to obtain the requested book Ns located at the shelf section A13. To do so, first, the mobile computer 117 issues commands to position the robot 1 in front of the bookrack A1 (and its bookshelf section A13). That is, while sensing the position of the carriage 11 of the robot 1 using the distance sensors 115 mounted on the carriage 11 and the identification information recognition unit 51 of the hand mechanism 5, the mobile computer 117 controls the propulsion motor 114, X-axis servo motor 14x, Y-axis servo motor 14y, Z-axis servo motor 14z, etc., as required move the carriage 11 along the guide path W, and guide it to a position in which the robot 1 is properly positioned in front of the bookrack A1, where the shelf section A13 is located.

When the robot 1 arrives in front of the prescribed bookrack A1, it may be necessary to move the carriage 11 sideways toward the bookrack A1 so that the hand mechanism 5 will be close enough to reach the books N on the shelf in section A13 when the in-out guide rail 12y is fully extended. To do this, first, the steering table 112 is rotated 90 degrees in the direction that will position the drive wheels 111 to move the carriage 11 toward the bookrack A1. The drive wheels 111 are then are driven {in proportion to the difference between the distance to the bookrack A1, as measured by the direction sensors (ultrasonic sensors) 115 installed on the side panel 11a of the carriage 11, and the maximum extendable distance of the in-out guide rail 12y, stopping the carriage 11 when these two distances are equal. \2} FIG. 2 shows a robot 1 that has been stopped with its carriage 11 parallel to, and sufficiently close to, the bookrack A1.

The robot now enters operation to remove the requested book Ns from shelf section A13 of bookrack A1. The description will start by referring to FIGS. 2 and 3. First, the hand mechanism 5 is moved to an established reference position on the bookrack A1. For the bookrack A1 in the example of FIG. 2, the reference position is at the 'a11' shelf section indicator, which is located on the left side frame of the bookrack (left when facing the bookrack), adjacent to the bottom shelf A11. To move the hand mechanism 5 to this reference position, first the Z-axis servo motor 14z of the vertical motion control unit 13z is controlled to lower the hand mechanism 5 (along with the in-out guide rail 12y) along the vertical guide rail 12z, to the lowest possible position. Next, the X-axis servo motor 14x of the lateral motion control unit 13x is controlled to move the hand mechanism 5, along with the in-out guide rail 12y and the vertical guide rail 12z, to the left along the lateral guide rail 12x, stopping when the identification information recognition unit 51 of the hand mechanism 5 reads the 'a11' shelf section identification indicator affixed to the reference position location (the shelf section identifier for the lowest shelf section). Normally, to improve the stability of the robot during transit, the relatively heavy hand mechanism 5 is lowered and stowed at the base of the vertical guide rail 12z. The reference position on the bookrack is therefore put on the lowest shelf section, to minimize the distance from the stowed position to the reference position.

Next, the vertical motion control unit 13z is operated to raise the hand mechanism 5 along the vertical guide rail 12z. As the hand mechanism 5 rises, its identification information recognition unit 51 reads each of the shelf section identifiers, in sequence (a11, a12, a13 . . . ). When it reads 'a13' (the identifier for shelf section A13, the section in which the requested book Ns is stored), the hand mechanism 5 is stopped. The hand mechanism 5 is now positioned opposite the row of books N in the shelf section A13 (which includes the desired book Ns).

Next, the lateral motion control unit 13x is operated to move the hand mechanism 5 to the right along the lateral guide rail 12x. As the hand mechanism moves, its identification information recognition unit 51 reads each of the book identifiers Nx affixed to the spine portions Ne of the books N placed upright along the shelf section A13. When it reads 'Nxs,' (the book identifier of the requested book), the hand mechanism 5 is stopped. The hand mechanism 5 is now positioned exactly opposite the spine Ne of the desired book Ns.

When the hand mechanism 5 is moved {as described above (that is, when the identification information recognition unit 51 reads each of the shelf section identifiers in sequence (a11, a12, a13 . . . ), stopping the hand mechanism 5 when it reads the identifier for shelf section A13, the section in which the requested book Ns is stored; or when the identification information recognition unit 51 reads each of the book identifiers Nx of the books N placed upright along the shelf section A13, stopping the hand mechanism 5 when it is positioned exactly opposite the requested book Ns) \3}, its momentum may carry it beyond the target position. The prescribed vertical and lateral stop points, however, are stored in the memory of the Z-axis encoder 15z and X-axis encoder 15x. Therefore, when such overruns occur, the hand mechanism 5 is simply backed up, based on this stored data, to reposition it precisely in the prescribed location.

Next, the in-out motion control unit 13y is operated to extend the in-out guide rail 12y to position the hand mechanism 5 (mounted on the forward end of the guide rail 12y) close enough to the requested book Ns (in the shelf section A13) to enable sufficient manipulation of the requested book Ns by the hand mechanism 5. When the hand mechanism 5 comes close enough to the requested book Ns, this fact is sensed by its touch finger 54 touching the spine Ne of the requested book Ns. This operates a limit switch (not shown in the drawing), stopping the advance of the hand mechanism 5. In this state, the book pullout finger 521 of the book pullout mechanism 52 of the hand mechanism 5 is positioned above the requested book Ns, as indicated by solid lines in FIG. 4.

From this state, the book pullout mechanism 52 of the hand mechanism 5 operates to pull the requested book Ns from the row of books in the shelf section A13 by a process illustrated in FIG. 4. First, the vertical control unit 13z operates to move the hand mechanism 5 slightly downward. This lowers the entire book pullout mechanism 52 in the direction of the arrow Z', changing its position with respect to the requested book Ns from the position indicated by solid lines in FIG. 4 to the position indicated by dotted lines. In this state, the book pullout finger 521 either makes spring pressure contact with the upper edge of the requested book Ns, or resiliently engages (hooks) the top edge of its spine Ne. In addition, this downward motion of the book pullout mechanism 52 rotates the finger lever 522 and the movable guide 527 in the upward direction of the arrow α1, operating the limit switch 528a, thus stopping the downward motion of the hand mechanism 5 and book pullout mechanism 52.

Figure 8A:
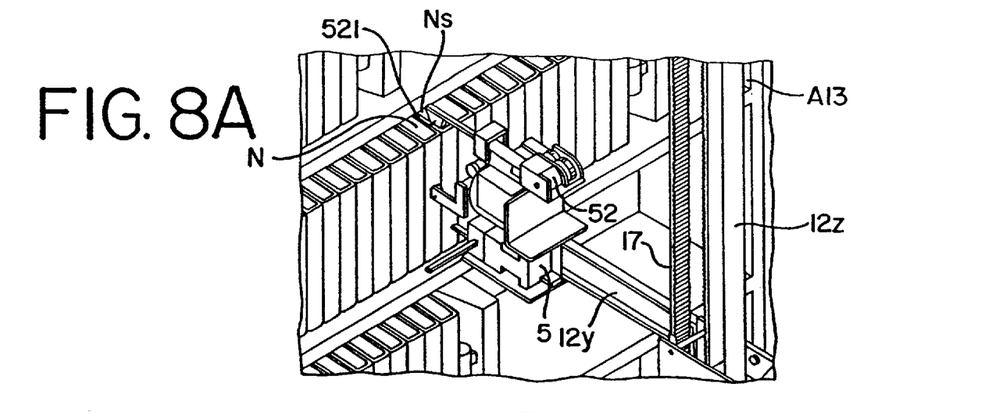
FIG. 8 is a drawing to aid the description of operation of the hand mechanism of FIG. 3
Figure 8B:
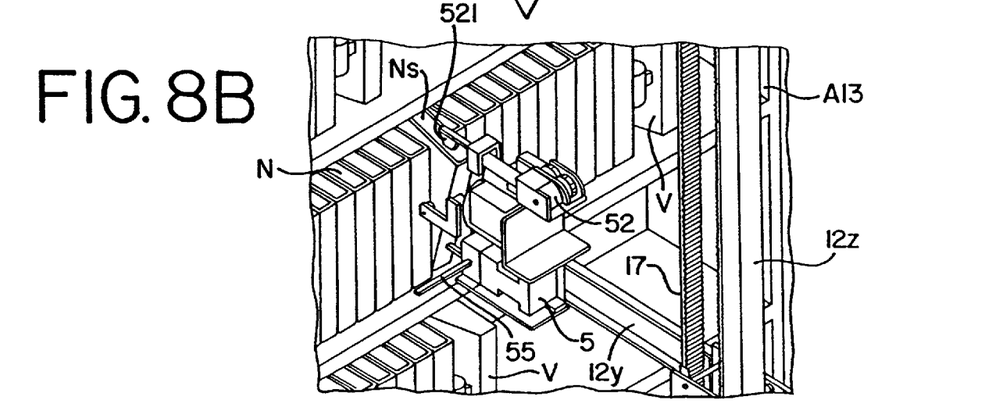
Figure 8C:
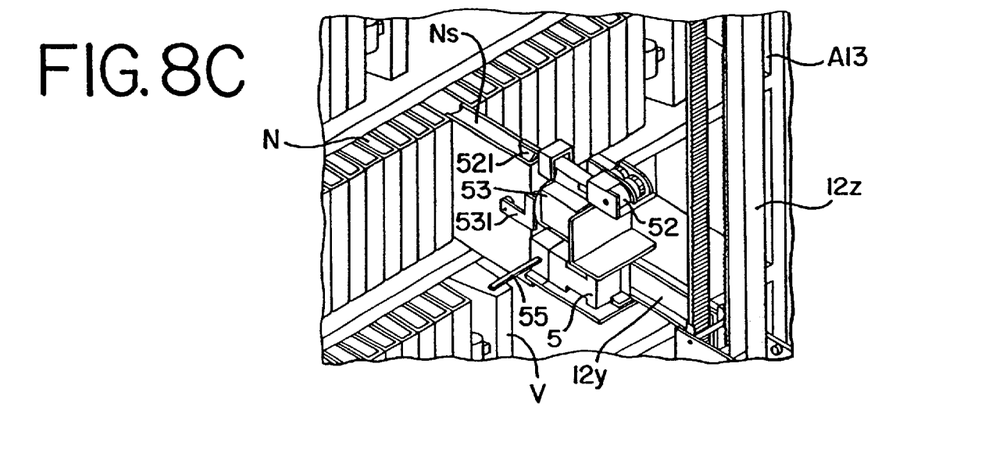

Next, the take-up pulley 524 is rotated in the direction of the arrow α2, taking up the belt 525 around the take-up pulley 524, and drawing the book pullout finger 521, along with finger lever 522, rearward, as indicated by the dot-dash lines in FIG. 4. This rotates the requested book Ns in the direction of the arrow α3, pulling the request book Ns from the row of books in the shelf section A13. With the book Ns in this state, the portion of the requested book Ns that has been pulled out is held between the arms 531 and 532 of the book holding mechanism 53, by pressing inward on the front and back covers of the requested book Ns. From this state, the in-out motion control unit 13y is operated to retract the in-out guide rail 12y, along with the hand mechanism 5, rearward. This accomplishes the error-free removal of the requested book Ns from the shelf section A13 of the bookrack A1. The process described above by which a robot 1 of the present invention operates its hand mechanism 5 to remove a requested book Ns from a row of books N in shelf section A13 is illustrated in FIG. 8, starting from the state shown in (a) and proceeding through (b) to arrive at the state shown in (c).

From this state, the vertical control unit 13z is operated to lower the hand mechanism 5 (with the requested book Ns still being held by its book holding mechanism 53) to a low point on the robot 1, to render the robot 1 more stable during transit. The robot 1 takes the requested book Ns to the bookrack-end container station 42, places it in the container 44, and then, the robot returns to its initial (standby) state. The requested book Ns is then transported by the conveyer 43 to the counter-end container station 41, where it is removed by a library staff member P and provided to the library patron Q.

The process of taking a book returned by a library patron Q and reshelving it the proper shelf section will now be described. When a returned book Np is received at the checkout/return counter U, a library staff member P enters the book ID data Nxp for the returned book (not shown in the drawing) into the input unit 21 of the host computer 2 and performs the return process. The returned book Np is then transported to the bookrack-end container station 42 by the conveyer 43 of the book transport system 4.

Meanwhile, in a process similar to that described above for retrieving a requested book, the host computer 2 runs a comparison between the 'returned book ID data' Nxp (the data just received via the input unit 21) and its 'book-to-shelf-section identification information cross-reference data,' to find the shelf section in which the returned book Np is to be reposited (the prescribed shelf section storage location information, e.g., shelf section ID 'a13,' which is the ID code for shelf section A13). This shelf section ID data 'a13' is transmitted, along with the returned book ID data Nxp, to one of the robots 1. The robot 1 receiving this data proceeds to the bookrack-end container station 42 and, using the book holding mechanism 53 of its hand mechanism 5, picks up the returned book Np (with its book ID data Nxp attached). The robot 1 then proceeds to the bookrack A1, and positions its hand mechanism 5 at the shelf section A13 (with its shelf section identifier 'a13' attached).

Next, the lateral motion control unit 13x is operated to move the hand mechanism 5 rightward along the lateral guide rail 12x. As the hand mechanism moves, its identification information recognition unit 51 reads each of the book identifiers Nx affixed to the spine portions Ne of the books N placed upright along the shelf section A13. When it reaches a point where the identification information recognition unit 51 recognizes a break in the Nx book identifiers (the end of the row of books N), the hand mechanism 5 (holding the returned book Np) is moved further right by an amount equal to the thickness of one book, and stopped. In this state, the returned book Np (which is in the grasp of the arms 531 and 532 of the book holding mechanism 53 of the hand mechanism 5), is directly opposite the reshelving guide slot 61b between the end of the row of books and the wedge-shaped housing 61.

Figure 7A:
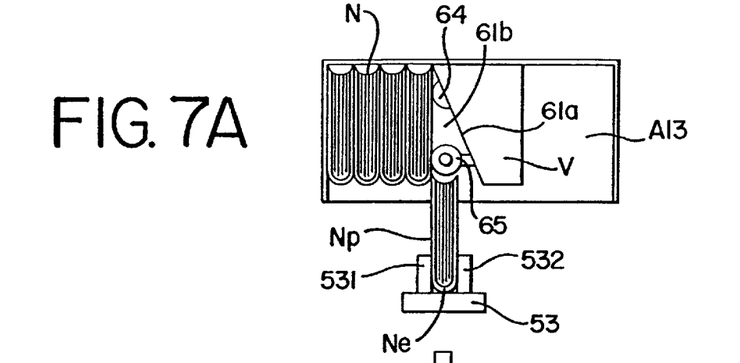
FIG. 7 is a drawing to aid the description of the operation of the hand mechanism of FIG. 3 with respect to the reshelving of books.
Figure 7B:
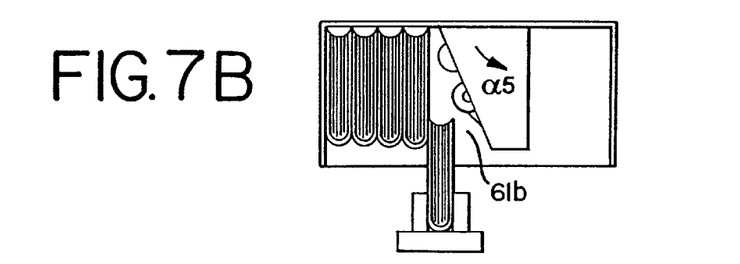
Figure 7C:
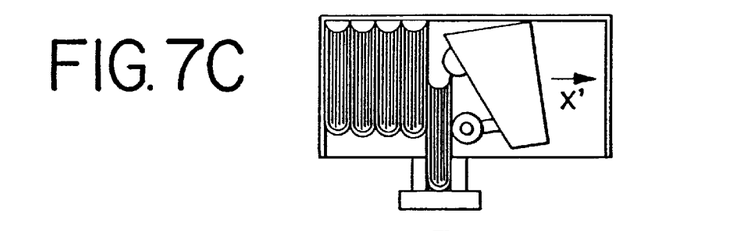
Figure 7D:
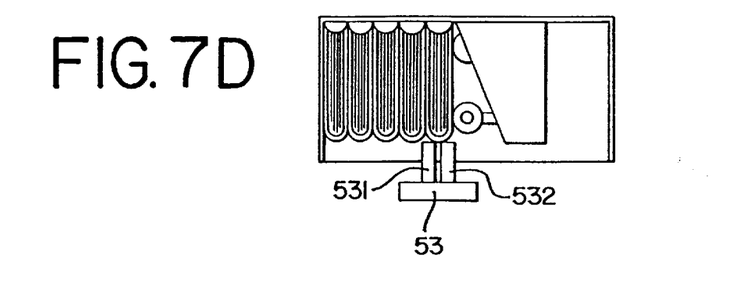

From this state, the in-out motion control unit 13y is operated to extend the hand mechanism 5 forward to thereby push the returned book Np, held between the arms 531 and 532 of the book holding mechanism 53, into position at the end of the row of books in its prescribed shelf section storage location A13. Shown in FIG. 7(a) through (d) are the states occurring in this process, in the sequence in which they occur. In the initial state, shown in FIG. 7(a), both the fixed guide roller 64 and the rocking guide roller 65 of the bookend V are touching the end surface of the row of books. From this initial state, the returned book Np is pushed forward into the shelf at the location of the rocking guide roller 65. As the returned book Np is pressed in, it pushes the bookend V outward as indicated by the arrows α5 and X', widening the reshelving guide slot 61b as it slides into it. As it is pushed in, the returned book Np is guided smoothly, and without friction, by the fixed guide roller 64 and the rocking guide roller 65. In addition, as the returned book Np pushes the rocking guide roller 65 back into the wedge-shaped housing 61, as shown in FIG. 7(b), damage to the returned book Np is prevented by the large buffering effect of the spring 67 acting on the rocking guide roller 65. As the returned book Np is pressed further inward to assume the state shown in (c), the restitutive force of the spring 67 (the force it exerts to reach equilibrium) presses the rocking guide roller 65 outward to where it again protrudes from the wedge-shaped housing 61, resulting in a reactive force that shifts the front end (narrow end) of the bookend V to the right. This movement of the front end of the bookend V is followed by the rear end, which also moves to the right. Once the returned book Np has been pushed in by a given amount, the arms 531 and 532 of the book holding mechanism 53 release the returned book Np, to assume the state shown in FIG. 7(d). Now, with the forward edges of the arms 531 and 532 butted against the spine Ne thereof, the returned book Np is pushed fully into place.

If the bookend V is not properly positioned against the end of the row of books after the returned book Np has been completely replaced in the shelf section A13, the following operation is performed: The hand mechanism 5 is moved further to the right while also being moved deeper into the bookshelf section A13, after which it is moved back to the left, pressing its pusher 55 against the side of the bookend V, until the bookend V is properly positioned against the end of the row of books N.

Moreover, the above means for using the hand mechanism 5 to retrieve books from and reposit them in the bookracks can also be used as the means by which the robot 1 removes books from, and places them in a container 44 at the bookrack-end container station 42.

As is clear from the above example, in an automated library system according to the present invention, to retrieve requested books from the library bookracks or reposit returned books therein, an individual at a book checkout/return counter has only to identify the books to be retrieved or reposited to a host computer. This sets into motion a series of fully automatic operations: The host computer performs an error-free search for the prescribed shelf section ID data for the book, and sends this information, along with the specified book's book ID data, to a book retrieving and repositing robot. Based on this information, the robot (a mobile unit capable of moving itself back and forth among pre-existing bookracks) proceeds, without error, to a requested book's prescribed storage location, removes the requested book and transports it (or transports, without error, a returned book to its prescribed storage location, and reshelves it). Thus the detailed tasks of retrieving and repositing books, which formerly had to be performed entirely by hand, are almost completely automated, without sacrificing anything in terms of precision or attention to detail.

This not only improves the total work efficiency of the library, but also relieves the library staff of routine unskilled tasks, thus freeing them to focus on performing intellectual work, and specialized library services. At the same time, the system eliminates the reshelving errors that frequently occur when reshelving is performed manually, and the valuable time spent looking for books that are misplaced when such errors occur. Also because the system requires no major conveyer apparatus, it can easily be implemented in existing libraries without extensive changes to facilities. This greatly reduces the financial burden for facility upgrading and maintenance. Moreover, because the system is compatible with common open-shelf-type bookracks, it is easy to introduce in ordinary libraries without alienating their users.

According to the present invention, in the book retrieving and repositing robot and automated library system incorporating a robot, the robot is capable of removing books from the bookshelves without damaging them. As described above, the hand mechanism of the robot has a book pullout mechanism that performs this operation. The pullout mechanism has a finger lever with a book pullout finger at its forward end for making frictional contact with the top of the book, or hooking the top edge of its spine. A flexible belt is used to link the rear end of this book pullout finger to a take-up pulley driven in rotation by a finger motor. In this configuration, the force applied to the finger lever to press the book downward for removal is a resilient force. This prevents the book pullout finger from imparting shock to the upper edge of the book, thus reducing damage to the book.

In the present invention, a substantially wedge-shaped bookend having fixed and rocking guide rollers is used to facilitate the reshelving of books by a robot. In each of the shelf sections, a wedge-shaped bookend is placed at the end of the row of books, positioned with the inclined side of the bookend toward the surface (cover) of the book at the end of the row. This makes it possible for a returned book being reshelved to be gently inserted between the wedge-shaped bookend and the end of the row of books, thus greatly reducing damage incurred by books during the reshelving process.

The foregoing describes the preferred embodiment of the invention. A variety of modifications could be made, however, without deviating from the scope of the invention as defined by the following claims.

What is claimed is:

1. An automated library system with retrieving and repositing robot comprising:
    a bookrack in which are formed a plurality of shelf sections having shelf section identification information indicated thereon, in which library books having book identification information indicated thereon are stored upright in shelf sections prescribed therefor, said bookrack being provided such that library staff and library patrons may directly access and manually remove said library books at will;
    a host computer including
        an input unit for inputting, from a book checkout counter, requested book identification information for books requested by library patrons for reading or borrowing,
        a memory unit for storing book-to-shelf-section identification information cross-reference data which relates accessing book identification information to corresponding prescribed shelf sections,
        a computation unit for searching for said requested book's prescribed shelf section storage location information by comparing said requested book identification information inputted by said input unit with said book-to-shelf-section cross-reference data, and
        an output unit for outputting, along with said requested book identification information, the requested book's prescribed shelf section storage location information obtained as a result of said search; and
    a retrieving and repositing robot that moves itself around the periphery of said bookrack, including
        a carriage that moves itself around the periphery of said bookrack,
        a hand mechanism,
        a control unit for controlling three-dimensional motion of said hand mechanism opposite said bookrack, and
        a mobile computer for performing guidance control of said carriage and the three-dimensional motion of said hand mechanism, based on requested book identification information and requested book prescribed shelf section storage location information output from said host computer,
        said hand mechanism further including
            an identification information recognition unit for detecting shelf section identification information indicated on said bookrack as well as book identification information indicated on said library books, and recognizing a requested book's prescribed shelf section storage location, and a requested book present at that prescribed shelf section storage location,
            a book pullout mechanism for pulling-out a requested book from a row of books in a shelf section, and
            a book-holding mechanism for removing the pulled-out book by grasping said book across the thickness direction thereof,
    wherein said hand mechanism, control unit, and mobile computer are mounted, along with a mobile electrical power supply, on said carriage.

2. An automated library system with retrieving and repositing robot according to claim 1, wherein provided on said carriage are a lateral guide rail, an in-out guide rail, and a vertical guide rail, each oriented along a different one of said three-dimensional orthogonal axes, said guide rails being interconnected such that each of said guide rails is movable along the orthogonal axis of another of said guide rails; also provided, on the carriage, for each of said guide rails, is a control unit for controlling the motion of the guide rail along the axes of the other of said guide rails; and said hand mechanism is installed on said in-out guide rail.

3. An automated library system with retrieving and repositing robot comprising:
    a bookrack in which are formed a plurality of shelf sections having shelf section identification information indicated thereon, in which library books having book identification information indicated thereon are stored upright in shelf sections prescribed therefor, said bookrack being provided such that library staff and library patrons may directly access and manually remove said library books at will;
    a host computer including
        an input unit for inputting, from a book checkout counter, returned book identification information for books returned by library patrons
        a memory unit for storing book-to-shelf-section identification information cross-reference data that relates accessing book identification information to corresponding prescribed shelf sections,
        a computation unit for searching for said returned book's prescribed shelf section storage location information by comparing said returned book identification information inputted by said input unit with said book-to-shelf-section cross-reference data, and
        an output unit for outputting, along with said returned book identification information, the returned book's prescribed shelf section storage location information obtained as a result of said search; and
    a retrieving and repositing robot that moves itself around the periphery of said bookrack, including
        a carriage that moves itself around the periphery of said bookrack,
        a hand mechanism,
        a control unit for controlling three-dimensional motion of said hand mechanism opposite said bookrack, and
        a mobile computer for performing guidance control of said carriage and the three-dimensional motion of said hand mechanism, based on the returned book's prescribed shelf section storage location information output from said host computer,
        said hand mechanism further including
            an identification information recognition unit for detecting shelf section identification information indicated on said bookrack as well as book identification information indicated on said library books, and recognizing a returned book's prescribed shelf section storage location, and the end of the row of books in the prescribed shelf section storage location,
            a book-holding mechanism for holding the returned book by grasping said book across the thickness direction thereof, aligning it with the end of the row of books in the prescribed shelf section storage location, and pushing it in, wherein said hand mechanism, control unit, and mobile computer are mounted, along with a mobile electrical power supply, on said carriage.

4. An automated library system with retrieving and repositing robot according to claim 3, wherein provided on said carriage are a lateral guide rail, an in-out guide rail, and a vertical guide rail, each oriented along a different one of said three-dimensional orthogonal axes, said guide rails being interconnected such that each of said guide rails is movable along the orthogonal axis of another of said guide rails; also provided, on the carriage, for each of said guide rails, is a control unit for controlling the motion of the guide rail along the axes of the other of said guide rails; and said hand mechanism is installed on said in-out guide rail.

5. An automated library system with retrieving and repositing robot according to claim 3, wherein placed on each of said shelf sections is a bookend, configured such that:

inside of a substantially wedge-shaped housing having trapezoid-shaped top and bottom surfaces and an inclined side surface, positioned at the wide end of said wedge-shaped housing, is a fixed guide roller, axially supported by a vertical shaft such that a portion of the outer circumference of said fixed guide roller partially protrudes outward of said housing through a window formed in the inclined side surface thereof; and positioned at the narrow end of said wedge-shaped housing is a rocker arm having at a free end thereof a rocking guide roller axially supported by a vertical shaft, the other end of said rocker arm being axially supported by a vertical shaft such as to be rotatable thereabout in a manner such as to allow said rocking guide roller to float outward of a window formed in said inclined side of said housing, said bookend being provided on said bookshelf section such as to be urged in the direction in which said rocking guide roller emerges from said window, with the wide end of said bookend facing the back of said bookshelf section and the inclined side of said bookend facing the end of a row of books on said bookshelf section, such that a wedge-shaped slot formed between the inclined side surface of the bookend and the end of said row of books can function as a guide slot for reshelving returned books.

6. A book retrieving and repositing robot for a library, comprising:

a carriage that moves itself around a bookrack in which are formed a plurality of shelf sections having shelf section identification information indicated thereon, in which library books having book identification information indicated thereon are stored upright in shelf sections prescribed therefor, said bookrack being provided such that library staff and library patrons may directly access and manually remove said library books at will;

a hand mechanism mounted on said carriage;

a control unit mounted on said carriage for controlling three-dimensional motion of said hand mechanism opposite said bookrack;

a mobile computer mounted on said carriage for obtaining, based on instructions from a library book checkout and return counter, the identification information for a requested book along with the requested book's prescribed shelf section storage location, and performing guidance control of said carriage and the three-dimensional motion of said hand mechanism; and a mobile power supply mounted on said carriage, said hand mechanism including an identification information recognition unit for detecting shelf section identification information indicated on said bookrack as well as book identification information indicated on said library books, and recognizing a requested book's prescribed shelf section storage location, and a requested book present at that prescribed shelf section storage location, a book pullout mechanism for pulling-out a requested book from a row of books in a shelf section; and a book-holding mechanism for removing the pulled-out book by grasping said book across the thickness direction thereof.

7. A book retrieving and repositing robot for a library according to claim 6, further comprising a book pullout mechanism wherein, when pulling out a book placed upright in a shelf section, the rear end of a finger lever on the forward end of which is provided a pullout finger for making friction contact with or hooking an upper edge of said book, is linked by a belt to a take-up surface of a take-up reel that is driven in rotation by a finger motor, and a resilient force is applied to said finger lever, for pressing the upper edge of said book downward.

8. A book retrieving and repositing robot for a library according to claim 6, wherein provided on said carriage are a lateral guide rail, an in-out guide rail, and a vertical guide rail, each oriented along a different one of said three-dimensional orthogonal axes, said guide rails being interconnected such that each of said guide rails is moveable along the orthogonal axis of another of said guide rails; also provided, on the carriage, for each of said guide rails, is a control unit for controlling the motion of the guide rail along the axes of the other of said guide rails; and said hand mechanism is installed on said in-out guide rail.

9. A book retrieving and repositing robot for a library, comprising:

a carriage that moves itself around a bookrack in which are formed a plurality of shelf sections having shelf section identification information indicated thereon, in which library books having book identification information indicated thereon are stored upright in shelf sections prescribed therefor, said bookrack being provided such that library staff and library patrons may directly access and manually remove said library books at will;

a hand mechanism;

a control unit for controlling three-dimensional motion of said hand mechanism opposite said bookrack;

a mobile computer for obtaining based on instructions from a library book checkout and return counter, the identification information for a returned book along with the returned book's prescribed shelf section storage location, and performing guidance control of said carriage and the three-dimensional motion of said hand mechanism; and a mobile power supply, said hand mechanism including:

an identification information recognition unit for detecting shelf section identification information indicated on said bookrack as well as book identification information indicated on said library books, and recognizing a returned book's prescribed shelf section storage location, and the end of the row of books in the prescribed shelf section storage location; and a book-holding mechanism for holding the returned book by grasping said book across the thickness direction thereof, aligning it with the end of the row of books in the prescribed shelf section storage location, and pushing it in.

10. A book retrieving and repositing robot for a library according to claim 9, wherein provided on said carriage are a lateral guide rail, an in-out guide rail, and a vertical guide rail, each oriented along a different one of said three-dimensional orthogonal axes, said guide rails being interconnected such that each of said guide rails is moveable along the orthogonal axis of another of said guide rails; also provided, on the carriage, for each of said guide rails, is a control unit for controlling the motion of the guide rail along the axes of the other of said guide rails; and said hand mechanism is installed on said in-out guide rail.

11. A hand mechanism for a book retrieving and repositing robot for a library, said hand mechanism placed opposite, and having its motion controlled in three dimensions with respect to, a bookrack in which are formed a plurality of shelf sections having shelf section identification information indicated thereon, in which library books having book identification information indicated thereon are stored upright in shelf sections prescribed therefor, said bookrack being provided such that library staff and library patrons may directly access and manually remove said library books at will, comprising:

an identification information recognition unit for detecting shelf section identification information indicated on said bookrack as well as book identification information indicated on said library books, and recognizing a requested book's prescribed shelf section storage location, and a requested book present at that prescribed shelf section storage location;

a book pullout mechanism for pulling-out a requested book from a row of books in a shelf section; and a book-holding mechanism for removing the pulled-out book by grasping said book across the thickness direction thereof.

12. A hand mechanism for a book retrieving and repositing robot for a library according to claim 11, further comprising a book pullout mechanism wherein, when pulling-out a book placed upright in a shelf section, the rear end of a finger lever on the forward end of which is provided a pullout finger for making friction contact with or hooking an upper edge of said book, is linked by a belt to a take-up surface of a take-up reel that is driven in rotation by a finger motor, and a resilient force is applied to said finger lever, for pressing the upper edge of said book downward.

13. A hand mechanism for a book retrieving and repositing robot for a library, said hand mechanism placed opposite, and having its motion controlled in three dimensions with respect to, a bookrack in which are formed a plurality of shelf sections having shelf section identification information indicated thereon, in which library books having book identification information indicated thereon are stored upright in shelf sections prescribed therefor, said bookrack being provided such that library staff and library patrons may directly access and manually remove said library books at will, comprising:

an identification information recognition unit for obtaining the prescribed shelf section storage location information for a returned book based on instructions from a library book checkout and return counter, detecting shelf section identification information indicated on said bookrack as well as book identification information indicated on said library books, and recognizing a returned book's prescribed shelf section storage location, and the end of a row of books in the prescribed shelf section storage location; and a book-holding mechanism for holding the returned book by grasping said book across the thickness direction thereof, aligning it with the end of the row of books in the prescribed shelf section storage location, and pushing it in.

* * * * *